(12) United States Patent
Sato et al.

(10) Patent No.: US 7,499,569 B2
(45) Date of Patent: Mar. 3, 2009

(54) HAND PATTERN SWITCHING APPARATUS

(75) Inventors: Hiromitsu Sato, Tokyo (JP); Keiichi Yamamoto, Tokyo (JP); Shinji Ozawa, Yokohama (JP); Hideo Saito, Yokohama (JP); Hiroya Igarashi, Yokohama (JP)

(73) Assignees: Mitsubishi Fuso Truck and Bus Corporation (JP); Keio University (JP)

( * ) Notice: Subject to any disclaimer, the term of this patent is extended or adjusted under 35 U.S.C. 154(b) by 667 days.

(21) Appl. No.: 11/064,428

(22) Filed: Feb. 23, 2005

(65) Prior Publication Data
US 2005/0238202 A1 Oct. 27, 2005

(30) Foreign Application Priority Data
Feb. 26, 2004 (JP) ............................ 2004-052014

(51) Int. Cl.
G06K 9/00 (2006.01)
G06F 3/033 (2006.01)
(52) U.S. Cl. .................. 382/103; 382/104; 382/203; 382/218; 715/863; 345/156; 348/77; 348/148
(58) Field of Classification Search .............. 382/103, 382/104, 203, 218; 715/863; 345/156; 348/77, 348/148
See application file for complete search history.

(56) References Cited
U.S. PATENT DOCUMENTS

| | | | |
|---|---|---|---|
| 5,203,704 A | 4/1993 | McCloud | |
| 5,454,043 A | 9/1995 | Freeman | |
| 5,594,469 A | 1/1997 | Freeman et al. | |
| 5,815,147 A | 9/1998 | Bogen et al. | |

(Continued)

FOREIGN PATENT DOCUMENTS

DE 195 36 170 A1 4/1997

(Continued)

OTHER PUBLICATIONS

Suat Akyol et al. "Gesture Control for Motor Vehicle Instrument Panel System" english translation of "Gestensteuerung Fur Fahrzeugbordsysteme", Sep. 13-15, 2000, 22nd DAGM Symposium, pp. 139-146.*

(Continued)

Primary Examiner—Aaron W Carter
(74) Attorney, Agent, or Firm—Rossi, Kimms & McDowell, LLP

(57) ABSTRACT

A camera for taking an image of movement of a hand, and a hand pattern switching apparatus which operates an object equipment based on the result of the image taken by the camera, having a storage unit for saving the image taken in the state that a hand does not exist in the image pickup area of the camera, as an initial image data, a differentiation unit for obtaining a difference image data between an original image data that is the image taken in the state that a hand exists in the image pickup area of the camera, and the initial image data, a luminance detection unit for obtaining an average luminance in a place close to a hand based on the image data of a place close to a hand obtained by the differentiation unit, and a processing unit for performing binary processing of the original image data by a threshold value based on the average luminance calculated by the luminance detection unit.

6 Claims, 3 Drawing Sheets

U.S. PATENT DOCUMENTS

| | | | |
|---|---|---|---|
| 6,002,808 A * | 12/1999 | Freeman | 382/288 |
| 6,072,494 A * | 6/2000 | Nguyen | 715/863 |
| 6,128,003 A | 10/2000 | Smith et al. | |
| 6,236,736 B1 * | 5/2001 | Crabtree et al. | 382/103 |
| 6,256,400 B1 * | 7/2001 | Takata et al. | 382/103 |
| 6,359,612 B1 | 3/2002 | Peter et al. | |
| 6,434,255 B1 | 8/2002 | Harakawa | |
| 6,564,144 B1 | 5/2003 | Cherveny | |
| 6,766,036 B1 | 7/2004 | Pryor | |
| 6,788,809 B1 * | 9/2004 | Grzeszczuk et al. | 382/154 |
| 6,804,396 B2 | 10/2004 | Higaki et al. | |
| 6,819,782 B1 | 11/2004 | Imagawa et al. | |
| 6,950,534 B2 | 9/2005 | Cohen et al. | |
| 7,006,055 B2 * | 2/2006 | Sukthankar et al. | 345/1.2 |
| 7,050,606 B2 | 5/2006 | Paul et al. | |
| 2002/0036617 A1 | 3/2002 | Pryor | |
| 2002/0041260 A1 | 4/2002 | Grassman | |
| 2002/0057383 A1 | 5/2002 | Iwamura | |
| 2002/0126876 A1 | 9/2002 | Paul et al. | |
| 2003/0138130 A1 * | 7/2003 | Cohen et al. | 382/103 |
| 2003/0214524 A1 | 11/2003 | Oka | |
| 2004/0141634 A1 | 7/2004 | Yamamoto et al. | |
| 2004/0161132 A1 * | 8/2004 | Cohen et al. | 382/103 |
| 2004/0189720 A1 * | 9/2004 | Wilson et al. | 345/863 |
| 2004/0190776 A1 * | 9/2004 | Higaki et al. | 382/190 |
| 2005/0063564 A1 | 3/2005 | Yamamoto et al. | |
| 2005/0271279 A1 * | 12/2005 | Fujimura et al. | 382/203 |
| 2006/0013440 A1 * | 1/2006 | Cohen et al. | 382/103 |
| 2007/0195997 A1 * | 8/2007 | Paul et al. | 382/104 |

FOREIGN PATENT DOCUMENTS

| | | |
|---|---|---|
| DE | 19654944 A1 | 6/1998 |
| DE | 19845030 A1 | 4/2000 |
| DE | 10039432 C1 | 12/2001 |
| DE | 103 49 568 A1 | 5/2004 |
| EP | 0 749 098 A2 | 12/1996 |
| JP | 9-206473 A | 8/1997 |
| JP | 11-24839 A | 1/1999 |
| JP | 11-134090 A | 5/1999 |
| JP | 2000-293666 A | 10/2000 |
| JP | 2001-216069 A | 8/2001 |
| WO | 2005/057493 A1 | 6/2005 |

OTHER PUBLICATIONS

Notification of Reasons for Rejection, dated Nov. 8, 2005, issued in JP Application No. 2004-052014, from which this US application claims priority.

German Office Action for corresponding German appplication DE 10 2004 038 965.9.

Akyol, Suat et al.; "Gestensteuerung für Fahrzeugbordsysteme"; DAGM-Symposium; Sep. 13-15, 2000; p. 139-146; Germany.

Relevant portion of German Office Action of corresponding German Application DE 10 2005 088 221.1.

Relevant portion of German Office Action of corresponding German Application DE 103 49 568.1-53.

Notice on Office Action from the Patent Office of the People's Republic of China, dated May 27, 2005, for a counterpart foreign application of a related co-pending US application.

German Office Action, dated Oct. 10, 2008, issued corresponding to DE10 2005 008 221.1.53.

McAllister, Gordon, et al., "Towards a non-contact driver-vehicle interface" 2000 IEEE Intelligent Transportation Systems, Conference Proceedings, Oct. 1-3, 2000, pp. 58-63, Dearborn, MI US.

* cited by examiner

HAND PATTERN SWITCHING APPARATUS

CROSS-REFERENCE TO RELATED APPLICATIONS

This application is based upon and claims the benefit of priority from prior Japanese Patent Application No. 2004-52014, filed Feb. 26, 2004, the entire contents of which are incorporated herein by reference.

BACKGROUND OF THE INVENTION

1. Field of the Invention

The present invention relates to a hand pattern switching apparatus suitable for easily operating equipment incidental to or installed in a vehicle, such as a side mirror, an air conditioner and audio equipment, without touching the operation panel or disturbing driving of the vehicle.

2. Description of the Related Art

It has been proposed to obtain the operating information on a vehicle-mounted equipment by taking an image of a part of a driver's body (e.g., a left hand) by a camera and recognizing the image pattern, as a technique of operating the vehicle-mounted equipment without touching the operation panel (refer to Jpn. Pat. Appln. KOKAI Publication No. 11-134090). It has also been proposed to obtain the information for operating the vehicle-mounted equipment by detecting the shape and gesture of a driver's hand (refer to Jpn. Pat. Appln. KOKAI Publication No. 2001-216069).

Such a technique is realized by a pattern recognizing process to recognize the shape of a hand, for example, from the image of the hand, and a motion detecting process to detect the motion of a hand by tracing the changes in the position of the recognized hand. It is called here a hand pattern switching apparatus or the like for the sake of convenience.

When a vehicle-mounted equipment is operated by using the above-mentioned hand pattern switching apparatus, it is necessary to detect the shape and motion of a driver's (operator's) hand securely and exactly. A hand includes a palm and fingers, and the words "palm" and "fingers" will be used hereinafter depending on the situation. It is first necessary to recognize exactly what part of the image of a driver's (operator's) hand is a hand or a palm.

It is necessary to separate a hand from the background when recognizing a hand from the image of the hand. The hand part in the image is bright (white), and the background is dark (black). Thus, a hand is extracted from the background by converting the image into white when the luminance of the image is brighter than a threshold value, and black when it is darker.

The illuminance of the environment in which the image of a driver's (operator's) hand is taken changes. This causes a problem that if the above-mentioned threshold value is fixed though the environment changes, a hand cannot be exactly extracted from the background.

BRIEF SUMMARY OF THE INVENTION

It is an object of the present invention to provide a hand pattern switching apparatus, which can exactly recognize a hand even if the illuminance of the environment to take the image of a hand changes.

According to one aspect of the present invention, there is provided a hand pattern switching apparatus comprising a means for saving the image taken in the state that a hand does not exist in the image pickup area of the image pickup means, as an initial image data; a differentiation means for obtaining a difference image data between an original image data that is the image taken in the state that a hand exists in the image pickup area of the image pickup means, and the initial image data; a luminance detection means for obtaining an average luminance in a place close to a hand based on the image data of a place close to a hand obtained by the differentiation means; and a processing means for performing binary processing of the original image data by a threshold value based on the average luminance calculated by the luminance detection means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
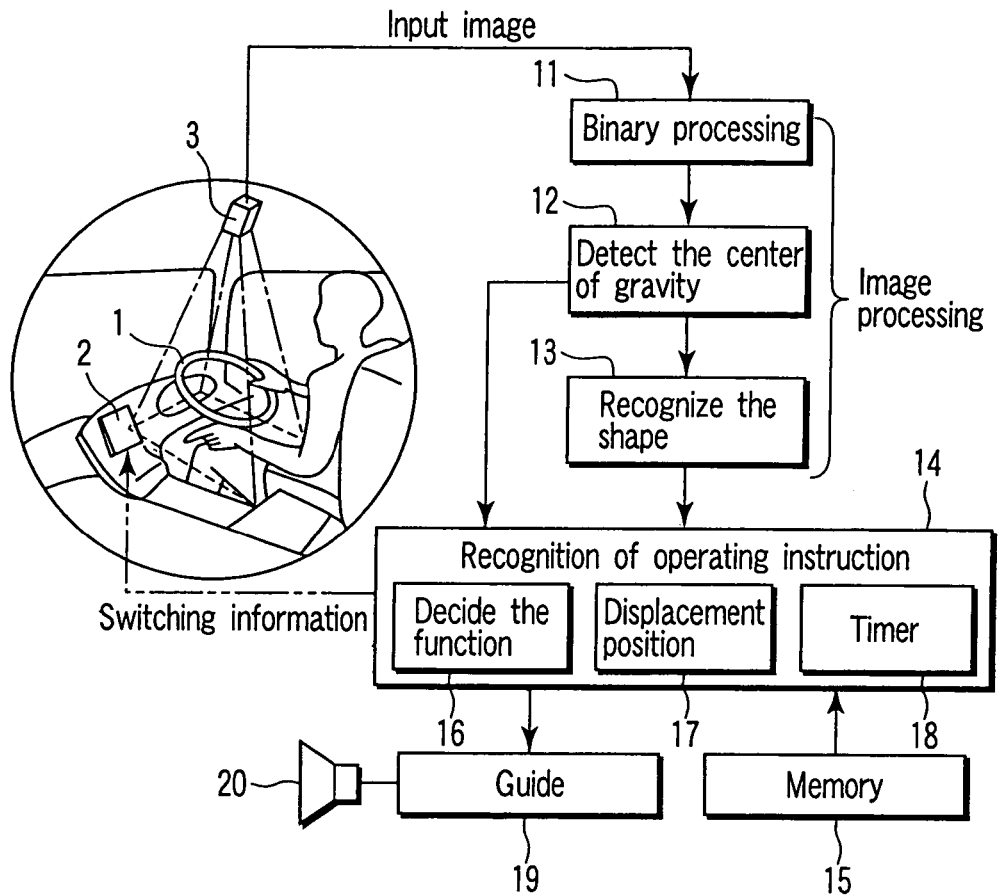
FIG. 1 is a schematic block diagram of a hand pattern switching apparatus according to an embodiment of the present invention.

An embodiment of the present invention will be explained hereinafter with reference to the accompanying drawings. FIG. 1 is a schematic block diagram of the essential part of the embodiment apparatus, showing the state of a driver's seat of a vehicle and the function of a hand pattern switching apparatus realized by a microcomputer or the like. In front of the driver's seat, there is provided a steering wheel 1 operated by a driver and a combination switch (not shown). On the console panel, there is provided an operation unit 2 of an audio equipment, air conditioner and so on. In the ceiling diagonally above the driver's seat, there is provided a video camera 3 for taking an image of a driver's hand when he stretches his arm to the image pickup area on the side of the steering wheel 1. The camera 3 is compact, like a CCD camera or the like. The operation against the hand pattern switching apparatus is performed by placing the palm substantially horizontal in the image pickup area, bending (putting in and out) a predetermined finger, for example the thumb selectively in this state, and displacing (moving) the position of a hand to the left or right. The camera 3 takes the image of the back of the hand, but the back of the hand will be referred to as a palm in the explanation.

The hand pattern switching apparatus basically recognizes the shape and motion of the driver's hand from the input images taken by the camera 3, and obtains predetermined switching information based on the result of recognition. The apparatus assumes the role of giving switching information to the above-mentioned audio equipment and air conditioner, instead of the above-mentioned operation unit 2. Concretely, the hand pattern switching apparatus has a binary processing unit 11 which processes the input image taken by the camera 3 as binary values, eliminates the background image component, and extracts the image of the front end of an arm, mainly the palm and hand, a center of gravity detection unit 2 which detects the center of gravity position from the image of palm and hand extracted in the binary processing unit 11 and a shape recognition unit 13 which recognizes the shape of the hand.

The hand pattern switching apparatus has further an operating instruction recognition unit 14 which recognizes the switching operation indicated by the shape and motion of the driver's hand according to the recognition result of the shape recognition unit 13 and the center of gravity of the hand detected by the center of gravity detection unit 12. The operating instruction recognition unit 14 has a function decision unit 16 which decides (discriminates) the kind of operation intended by the hand shape recognized as described above by referring generally to the relations between previously registered specific hand shape patterns and their roles, a displacement quantity detection unit 17 which detects a reference position or displacement quantity by tracing the shift of the center of gravity position of the hand having specific finger shapes or motion of fingers, and a timer 18 which monitors the motion of hand as passage of time. The operating instruction recognition unit 14 is configured to obtain predetermined switching information specified by the motion of the driver's hand shape based on the result of this decision and monitoring, and output the switching information to the above-mentioned audio equipment and air conditioner.

The operating instruction recognition unit 14 has a guide unit 19 which makes predetermined guidance for the driver according to the above decision result. The guidance is informed to the driver through a speaker 20 as a voice message to specify an audio equipment, air conditioner (object equipment) and volume/channel or air flow rate/temperature (object functions), or as a confirmation sound such as "beep" to indicate switching operation (operation quantity). The concrete operation form of the operating instruction recognition unit 14, that is, the output control of switching information for a plurality of control objects, such as an audio equipment and air conditioner will be described later.

Figure 2:
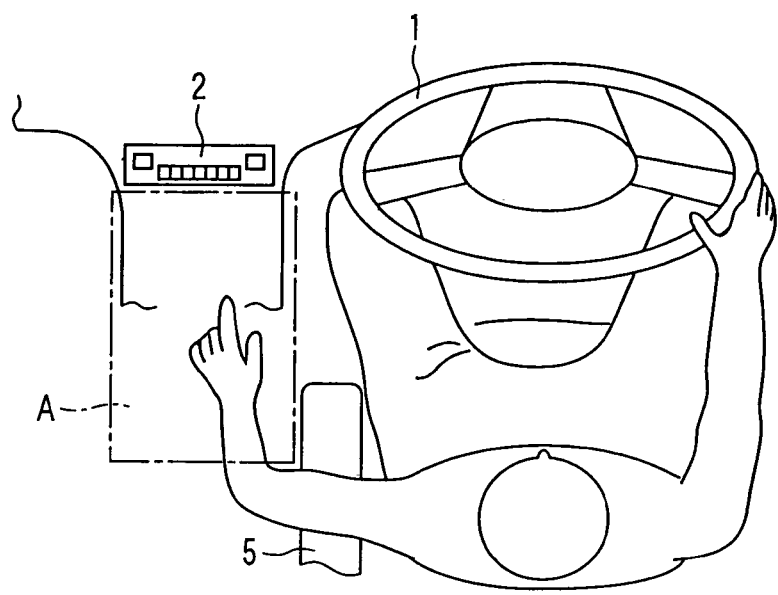
FIG. 2 is a view showing an area of taking the image of a hand in the hand pattern switching apparatus shown in FIG. 1.

The image pickup area A of the camera 3 is set to the side of the steering wheel 1 as shown in FIG. 2, at the position at least 50 mm, preferably 100 mm separated from the periphery of the steering wheel 1. The area is set as a position where the driver can stretch his arm without disturbing the driving position while putting his arm on an arm rest 5 provided on the side of the driver's seat, and as a position where the driver's hand does not touch the operation unit 2 of an audio equipment or the like. For example, the image pickup area A may be set as a substantially rectangular area, which is about 600 mm in the forward direction of the driver's hand stretched to the side of the steering wheel 1 without disturbing the driving position, or about 350 mm in the width direction of the hand. The background color of the image pickup area A is black.

Next, explanation will be given on the operation of the embodiment of the invention configured as described above. In this embodiment, a switching instruction is easily given by recognizing the image of the hand taken by the camera 3. The recognition process is started by sampling the input image taken in the image pickup area A at every image sampling time (e.g., 15 Hz) according to the threshold value calculated by the decision sampling time having the same cycle as the image sampling time, and processing the image as binary values in the binary processing unit 11, that is, regarding the background part as black and the part corresponding to the arm and hand in the image as white.

Figure 3:
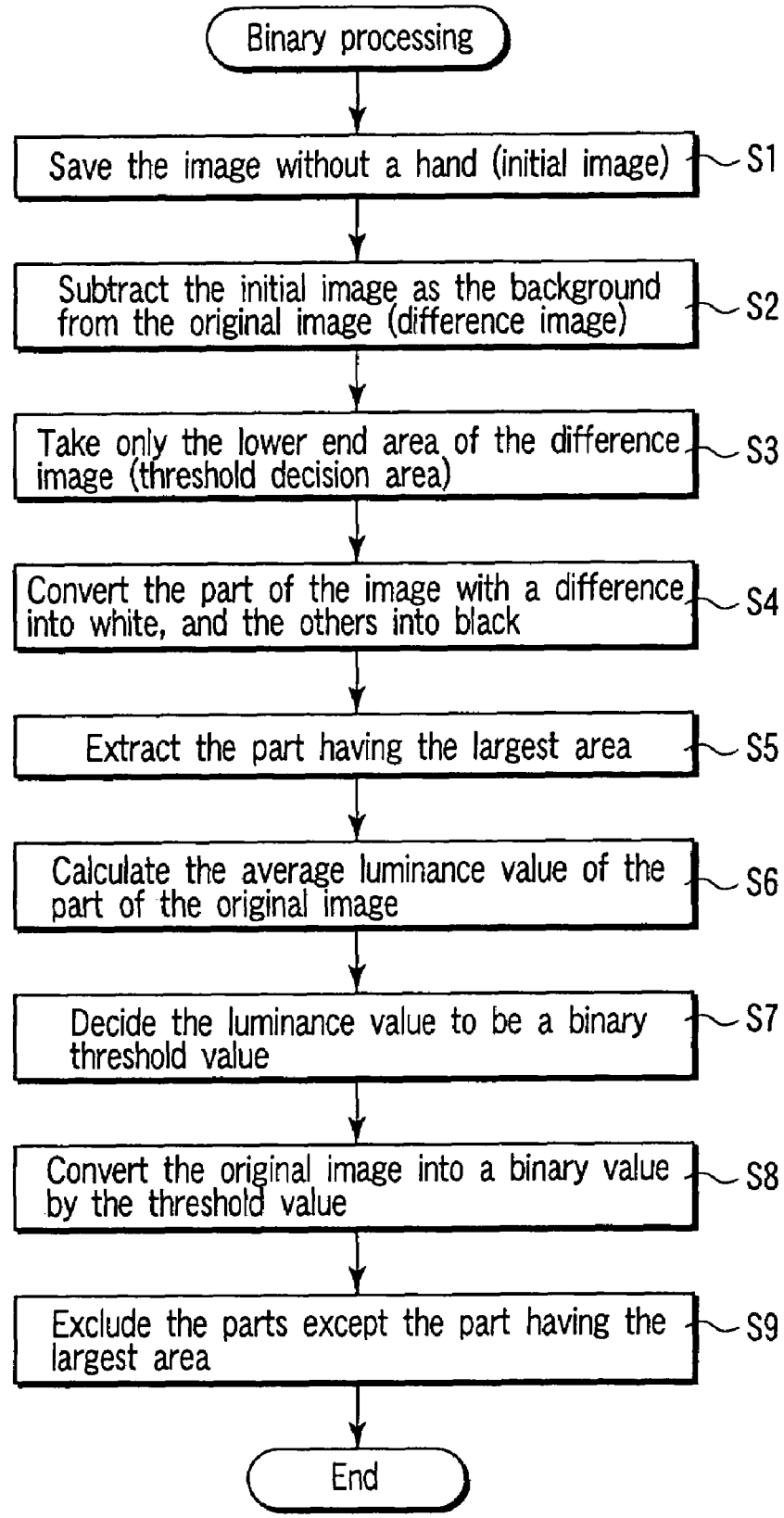
FIG. 3 is a flowchart for explaining binary processing according to the same embodiment.
Figure 4:
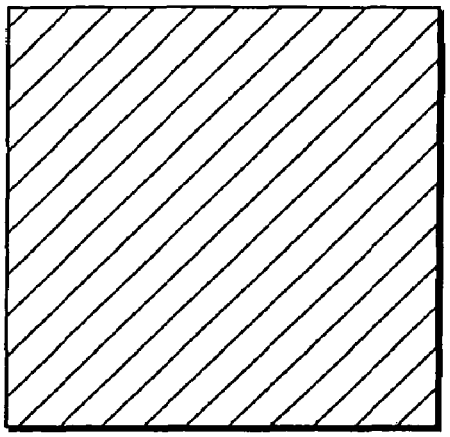
FIG. 4 is a view showing an initial image according to the same embodiment.

The binary processing will be explained with reference to the flowchart of FIG. 3. First, an image with no driver's hand seen in the image pickup area A is saved in a memory 15 as an initial image (step S1). The luminance value of the initial image is stored over all of the image pickup area A as shown in FIG. 4.

Figure 5:
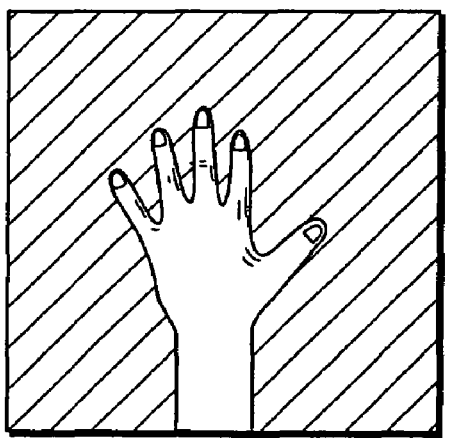
FIG. 5 is a view showing an original image according to the same embodiment.
Figure 7:
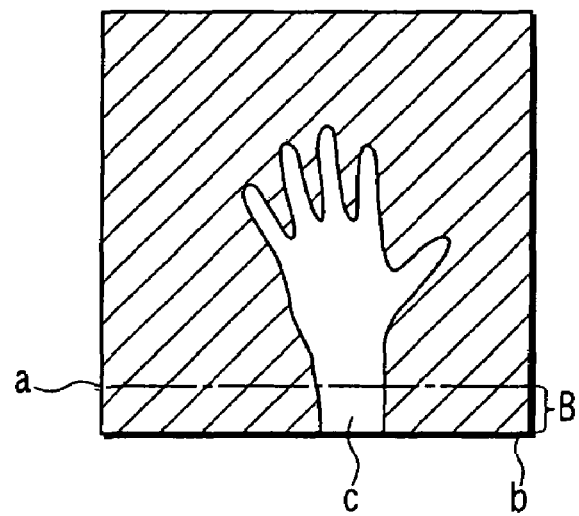
FIG. 7 is a view showing an area of deciding a threshold value of the difference image according to the same embodiment.

Next, an image with the driver's hand seen in the image pickup area A is taken by the camera 3. This image is taken by the camera 3 at every 15 Hz sampling time. The image with the driver's hand seen in the image pickup area A is saved in the memory 15 as an original image in this way as shown in FIG. 5. The image data taken by the camera 3 has the luminance of 8 bits per 1 pixel, that is, the luminance of 1 (black)-256 (white).

Figure 6:
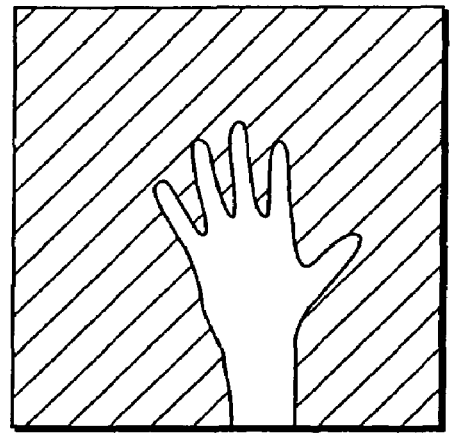
FIG. 6 is a view showing a difference image according to the same embodiment.

The luminance value of the initial image as the background is subtracted from the luminance value of the original image, and a difference image is calculated (step S2). The difference image data is saved in the memory 15 as shown in FIG. 6.

Next, only the lower end area B of the difference image data saved in the memory 15 is taken as a threshold decision area B (step S3). Namely, the addresses of the start point a and end point b of the threshold value decision area B are grasped. The area B is taken, because it can be foreseen that the driver's hand must exist in that area.

Then, in the difference image data belonging to the threshold decision area B, the part having the difference from the initial image data is converted into white data ("1"), and the other part is converted into black data ("0") (step S4).

Namely, the part having the hand in the threshold decision area B is converted into "1" (white), and the other is converted into "0" (black).

Next, the part having the largest area of "1" (white) in the threshold decision area B converted in step S4 (step S5) is extracted. Namely, the part having the largest area of the "1" (white) in the threshold decision area B is judged to be the driver's hand (concretely, the wrist) C.

Then, the average luminance value of the hand part C of the original image recorded in the memory 3 (step S6) is calculated. The average luminance value is 8-bit data.

A binary threshold value based on the average luminance value is decided, and it is stored in the memory 3 (step S7).

Binary processing of the original image data stored in the memory 15 is performed using this binary threshold value (step S8).

The binary threshold value is determined as follows. Namely, assuming that the average luminance of the hand part C calculated in step S6 is "150", the binary threshold value is "150−30 (set value)=120". When the average luminance value of the hand part C of the original image data is assumed to be x, it is seen that the luminance value of the actual whole hand is distributed in x±30. Therefore, if the luminance of the original image data larger than the average luminance value x is simply decided as white, and the luminance value smaller than the average value as black, the parts x−30 to x of the original image data will be converted as black, and the hand image may be judged to be smaller than the actual hand.

To avoid such a defect, the average luminance value x−30 is used here as a binary threshold value. With this threshold value, the threshold value becomes smaller than the average luminance value x, and the gray part (white and black are not definite, for example, near at the edge of the hand in the original image) is more likely to be judged white. Therefore, the hand close to the original hand can be discriminated. If the threshold value is set to the average luminance value x+30, the threshold value becomes larger than the average luminance value x, and the above-mentioned gray part is likely to be judged black. Thus, the hand is judged smaller than the hand discriminated by the average luminance value x.

The parts of the original image data stored in the memory 15 except the part with the largest area are excluded (step S9). For example, if a white thing such as a cigarette case exits in the image pickup area A in addition to a hand, it is excluded from the original image data as unnecessary image data (noise).

After binary processing is performed in this way, the center of gravity position is obtained from the image of the hand by the center of gravity detection unit 12, the shape of the hand is recognized by the shape recognition unit 13, and the switching information is obtained from the shape of the driver's hand by the operating instruction recognition unit 14.

As the image data of the driver's hand existing in the image pickup area A is read at every image sampling time of 15 Hz, and the image data is converted into binary values after the binary value threshold value is determined at every 15 Hz as described above, the shape of the hand can be recognized almost in real time by the shape recognition unit 13.

Therefore, even if the environment of the image pickup area A changes, the binary processing can follow the change in the environment. Namely, when a vehicle goes into and out of a tunnel, the shape of the driver's hand existing in the image pickup area A can be securely recognized.

The processing of step S4 may be executed in step S2.

Further, the threshold decision area B is not necessarily limited to the place defined in this embodiment. For example, the place near a shift knob may be used as a threshold value decision area.

Further, it is permitted to learn a frequency range based on the frequency distribution of a luminance value.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A hand pattern switching apparatus which operates an object equipment based on the result of the image taken by an image pickup means for taking an image of movement of a hand, comprising:

means for saving the image taken in a state where a hand does not exist in an image pickup area of the image pickup means, as an initial image data;

differentiation means for obtaining a difference image data between an original image data, which is the image taken in a state where a hand exists in the image pickup area of the image pickup means, and the initial image data, to determine a part of the difference image data corresponding to a place close to a hand;

luminance detection means for obtaining an average luminance of the original image data corresponding to the part of the difference image data in a place close to the hand obtained by the differentiation means; and processing means for performing binary processing of the original image data by a threshold value based on the average luminance obtained by the luminance detection means.

2. The hand pattern switching apparatus according to claim 1, wherein the luminance detection means is configured to obtain the average luminance of a part of the original image data corresponding to the part of the difference image data which has a largest area.

3. The hand pattern switching apparatus according to claim 1, wherein the processing means converts the original image data into binary data using a threshold value which is smaller than a value of the average luminance obtained by the luminance detection means by a set value.

4. A hand pattern switching apparatus for operating an object equipment based on a hand gesture, comprising:

an image pickup device that picks up an image in an image pickup area;

a storage device that stores an initial image data corresponding to an initial image of the image pickup area without any hand image in the image pickup area picked up by the image pickup device;

a differentiation unit that obtains a difference image data representing a difference image based on the difference between a hand image data representing a hand image in the image pickup area picked up by the image pickup device and the initial image data representing the initial image;

a luminance detection unit that obtains an average luminance close to the hand image based on the difference image data obtained by the differentiation unit; and a processing unit that performs binary processing of the hand image data by a threshold value based on the average luminance obtained by the luminance detection unit.

5. The hand pattern switching apparatus according to claim 4, wherein the luminance detection unit obtains the average luminance of a part of the hand image data corresponding to the part of the difference image data having a largest area.

6. The hand pattern switching apparatus according to claim 4, wherein the processing unit converts the hand image data into binary data using a threshold value that is smaller than a value of the average luminance obtained by the luminance detection unit by a set value.

* * * * *